United States Patent
Stoffels

(10) Patent No.: US 11,633,792 B2
(45) Date of Patent: Apr. 25, 2023

(54) APPARATUS FOR PROVIDING A COMPLETE TOOL

(71) Applicant: FRANZ HAIMER MASCHINENBAU KG, Igenhausen (DE)

(72) Inventor: Olaf Stoffels, Verl (DE)

(73) Assignee: Franz Haimer Maschinenbau KG, Igenhausen (DE)

( * ) Notice: Subject to any disclaimer, the term of this patent is extended or adjusted under 35 U.S.C. 154(b) by 0 days.

(21) Appl. No.: 17/015,148

(22) Filed: Sep. 9, 2020

(65) Prior Publication Data
US 2021/0069799 A1 Mar. 11, 2021

(30) Foreign Application Priority Data
Sep. 11, 2019 (DE) .............................. 102019124428

(51) Int. Cl.
| B23B 31/117 | (2006.01) |
| B23P 11/02 | (2006.01) |
| B23Q 17/24 | (2006.01) |
| B25J 11/00 | (2006.01) |

(52) U.S. Cl.
CPC ......... B23B 31/1179 (2013.01); B23P 11/027 (2013.01); B23Q 17/2457 (2013.01); B25J 11/005 (2013.01)

(58) Field of Classification Search
CPC ............. B23B 2231/24; B23B 31/1179; Y10T 279/17957; B23Q 17/2457; B23P 11/027; B23P 11/025; H05B 6/14; B25J 11/005
See application file for complete search history.

(56) References Cited

U.S. PATENT DOCUMENTS

| 7,062,847 B2 * | 6/2006 | Haimer ................. B23B 31/028 279/143 |
| 2006/0021208 A1 | 2/2006 | Pfau et al. |
| 2009/0035087 A1 * | 2/2009 | Nakamoto .......... B23B 31/1179 409/165 |
| 2009/0162157 A1 * | 6/2009 | Makino .............. B23Q 11/1015 408/56 |

(Continued)

FOREIGN PATENT DOCUMENTS

| DE | 10249072 A1 | 6/2004 |
| DE | 102005004166 A1 | 10/2006 |

(Continued)

OTHER PUBLICATIONS

Machine Translation, DE202015006540U1. (Year: 2015).*

*Primary Examiner* — Eric A. Gates
(74) *Attorney, Agent, or Firm* — Laurence A. Greenberg; Werner H. Stemer; Ralph E. Locher

(57) ABSTRACT

An apparatus for provisioning, in particular automatically, a complete tool having a toolholder and a tool, in particular a drilling and/or milling tool. The apparatus has a spindle that can be driven in rotation by a driving device. The spindle has a holding device for holding a toolholder. A measuring device, in particular an optical measuring device, measures a complete tool, held on the spindle. A heating device in the region of the spindle heats a shrink-fit chuck of the toolholder held on the spindle. A cooling device, in particular a cooling device associated with the spindle, enables the spindle and/or the complete tool held on the spindle, to be cooled.

14 Claims, 5 Drawing Sheets

(56) References Cited

U.S. PATENT DOCUMENTS

| | | | | |
|---|---|---|---|---|
| 2010/0051610 A1* | 3/2010 | Wittels | ................. | B23P 11/027 |
| | | | | 29/800 |
| 2020/0316730 A1* | 10/2020 | Zoller | ...................... | H05B 6/14 |
| 2020/0323049 A1* | 10/2020 | Zoller | ...................... | H05B 6/14 |
| 2020/0391335 A1* | 12/2020 | Zoller | ..................... | B23P 19/06 |

FOREIGN PATENT DOCUMENTS

| | | | | |
|---|---|---|---|---|
| DE | 102005033096 A1 * | 1/2007 | ........... | B23Q 17/002 |
| DE | 102009052549 A1 | 5/2011 | | |
| DE | 202015006540 U1 * | 12/2015 | ............... | H05B 6/14 |
| FR | 2844734 A1 * | 3/2004 | ............ | B23P 11/027 |
| WO | 03106105 A1 | 12/2003 | | |
| WO | 2015036428 A1 | 3/2015 | | |
| WO | 2018069410 A2 | 4/2018 | | |

* cited by examiner

APPARATUS FOR PROVIDING A COMPLETE TOOL

CROSS-REFERENCE TO RELATED APPLICATION

This application claims the priority, under 35 U.S.C. § 119, of German patent application DE 10 2019 124 428, filed Sep. 11, 2019; the prior application is herewith incorporated by reference in its entirety.

BACKGROUND OF THE INVENTION

Field of the Invention

The invention relates to an apparatus for the provision, in particular automated provision, of a complete tool, to a shrinkage and measurement station, to a provisioning system, in particular automated provisioning, of a complete tool having the shrinkage and measurement station, and also to a method for operating the provisioning system.

For machine tools that operate at high speeds or with special precision requirements, especially drilling or milling machines or lathes, the use of shrink-fit chucks is widespread since they operate with a particularly high concentricity and particularly reliable torque transmission between the toolholder and the tool. Such toolholders have a central receiving opening, the diameter of which is slightly smaller than the outside diameter of the tool to be received. To insert the tool into the toolholder, the holder is heated, for instance by using an inductive heating device or a heating blower, until the receiving opening has expanded sufficiently for the tool to be inserted. When the toolholder cools down, where applicable with the assistance of a cooling device, the toolholder shrinks and clamps the tool reliably and on all sides. To remove the tool, the toolholder is once more heated until the tool can be pulled out of the receiving opening.

It is furthermore customary to measure a complete tool consisting of a toolholder and a shrunk-in tool before coupling to a machine tool, e.g. a machine tool designed as a CNC machining center, by means of a measuring device or pre-adjustment device and to use the dimensions determined to optimize the machining of the workpiece. During this process, it is in particular the length of the complete tool, the diameter and the shape of the cutting edge of the clamped tool which are measured. A measuring device of this kind generally has a spindle that can be driven in rotation by means of a driving device and has a holding device for holding a toolholder or a complete tool. Here, the complete tool is rotated axially by means of the spindle during measurement.

United States published patent application US 2006/0021208 A1 and its counterpart German published patent application DE 102 49 072 A1 disclose a method for securing a tool in a tool chuck, in which an actual position of the tool, particularly in the direction of the longitudinal axis of the tool, is first of all determined by measurement. The tool is then inserted into the tool chuck, positioned there on the basis of the actual position determined, and finally shrunk in. After shrinking in, the actual position of the tool in the tool chuck is then determined. During the shrink-fitting process and the determination of the actual positions of the tool, the tool chuck is in this case held on a CNC-controlled tool mounting spindle that can be rotated about an axis of rotation. Moreover, the toolholder and the tool are connected and the complete tool measured in a largely auto-mated way here. In this case, the toolholder and the tool are moved by means of a tool chuck changer and a tool gripper.

In the case of such shrink-fitting and measurement on a spindle, there is a relatively high heat input into the spindle, however, especially in the case of a high number of shrink-fitting and measurement processes within a short time, and this leads to a thermal expansion of the spindle and thus to a reduction in the measurement accuracy. Moreover, the use of a tool chuck changer to move the toolholder and of a separate tool gripper to move the tool is complex.

BRIEF SUMMARY OF THE INVENTION

It is accordingly an object of the invention to provide an apparatus for the provision, in particular automated provision, of a complete tool comprising a toolholder and a tool which overcomes the above-mentioned disadvantages of the heretofore-known devices and methods of this general type and which provides for the provisioning of complete tools in a simple and effective manner with a high repeatability. It is a further object of the invention to make available an apparatus for the provision, in particular automated provision, of a complete tool comprising a toolholder and a tool, which has a particularly simple, effective and flexible construction.

With the above and other objects in view there is provided, in accordance with the invention, an apparatus for provisioning a complete tool with a toolholder and a tool, the apparatus comprising:

a spindle to be driven in rotation by a driving device, said spindle having a holding device for holding the toolholder;

a measuring device for measuring the complete tool held on said spindle;

a heating device for heating a shrink-fit chuck of the toolholder held on said spindle; and a cooling device configured for cooling at least one of said spindle or the complete tool held on said spindle.

In other words, an apparatus for the provision, in particular automated or automatic provisioning, of a complete tool comprising a toolholder and a tool, in particular a milling tool, is proposed, having a spindle that can be driven in rotation by means of a driving device, wherein the spindle has a holding device for holding a toolholder, wherein a measuring device, in particular an optical measuring device, for measuring a complete tool, held on the spindle, and a heating device for heating a shrink-fit chuck of a toolholder held on the spindle are arranged in the region of the spindle. According to the invention, a cooling device, in particular a cooling device associated with the spindle, by means of which the spindle and/or a complete tool held on the spindle can be cooled, in particular air-cooled, is provided.

In this way, it is possible to provide complete tools with high repeatability and accuracy since heating of the spindle is counteracted by cooling the spindle. As a result, the thermal expansion of the spindle is reduced, and the measurement accuracy of the measuring device is effectively increased. In particular, it is also possible here to provide a higher number of complete tools within a defined period of time since it is no longer necessary to allow the spindle to cool down before a subsequent measurement process.

In a preferred embodiment of the apparatus according to the invention, the cooling device is formed by a cooling element which is associated with the spindle and by means of which the spindle can be air-cooled, in particular a ring-shaped and/or disk-shaped cooling element. It is thus possible to achieve effective cooling of the spindle with a simple construction. In particular, it is also possible to retrofit a cooling element of this kind with little effort on a spindle. Here, the cooling element is preferably manufactured from a material that has a high thermal conductivity, e.g. aluminum.

As an alternative to air cooling, the spindle could also be cooled by means of a coolant cooling system, in particular by means of a water cooling system. In this way, it is likewise possible to achieve effective cooling of the spindle. In this case, the cooling liquid could be passed through channels introduced into the spindle or through at least one heat sink resting against the spindle, for example.

One expedient possibility is for the cooling element to surround in a ring shape a spindle element of the spindle and/or an adapter element of the spindle, said adapter element being releasably connected to the spindle element and having the holding device. It is preferred here if the cooling element surrounds in a ring shape a holding section of the spindle, said holding section having the holding device. At this holding section, heat is transferred from a heated complete tool to the spindle, and thus such an arrangement of the cooling element counter-acts heating of the spindle in a particularly effective manner.

For effective cooling of the spindle, the ring-shaped cooling element can rest by means of an inner circumferential wall, in particular in surface contact, against the spindle. Alternatively, or in addition, it is also possible for the cooling element to rest by means of at least one end wall, in particular in surface contact, against the spindle.

In a preferred specific embodiment, the cooling element has an inner region, in particular a ring-shaped and/or sleeve-shaped inner region, and a plurality of cooling ribs, which project outward from the inner region, in order to achieve a simple and effective construction. Provision is preferably made here for the cooling ribs to have a profile which is arc-shaped or, in some section or sections, rectilinear, in a plan view of the cooling element.

One expedient possibility is for the holding device of the spindle to be designed to receive a machine tool interface of a toolholder. More specifically, the holding device of the spindle can have a steep taper (SK) interface, a hollow shank taper (HSK) interface or a polygonal shank taper (PSK) interface, for example.

For effective measurement of a complete tool, the optical measuring device can have at least one image acquisition device, in particular a camera, for acquiring images and/or film recordings of a complete tool held on the spindle. One expedient possibility is for the measuring de-vice to have a signal link to a screen and/or to a data transmission device for the transmission, in particular wireless transmission, as data of complete-tool dimensions determined, in particular to an RFID chip. Here, data transmission can also take place via Bluetooth, QR/data matrix or barcodes, for example.

In one specific embodiment, the heating device can have at least one coil element, which has an induction coil, for heating a shrink-fit chuck of a toolholder, in particular a coil element that can be mounted on a toolholder and/or is ring-shaped. By means of a coil element of this kind, a shrink-fit chuck of a toolholder can be heated effectively and quickly.

In another preferred embodiment, at least one, in particular coolant-cooled, cooling pot for cooling a complete tool can be provided, wherein a complete tool can be arranged partially or completely in an interior space of the cooling pot, in particular in an upside down orientation, and can be brought into contact, in particular surface contact, with a cooled inner wall of the cooling pot, in particular by means of a shrink-fit chuck section of a toolholder of the complete tool. A measured complete tool can be cooled effectively and quickly on a cooling pot of this kind that is separate from the spindle, in particular spaced apart from the spindle.

For simultaneous cooling of a plurality of measured complete tools, a plurality of cooling pots that are spaced apart from one another and/or arranged in series can be provided. One expedient possibility is for the at least one cooling pot to be fixed by means of at least one connecting element, in particular by means of at least one connecting screw.

With the above and other objects in view there is also provided, in accordance with the invention, an apparatus for the provision, in particular automated provision, of a complete tool comprising a toolholder and a tool, in particular a milling tool, having a controllable movement device, in particular having a controllable robot arm, for picking up and moving an object, wherein the movement device has a gripper for picking up a toolholder as an object, in particular at a gripper groove of the tool-holder. According to the invention, a tool, in particular a rod-shaped tool, as an object can also be gripped and/or picked up by means of the gripper.

By means of a gripper of this kind, particularly simple, effective and flexible provision of complete tools is made possible since it is now possible to grip or pick up both toolholders and tools by means of a single gripper. In this way, automated provision or production of a complete tool can be achieved by means of a single gripper, for example.

Here, the movement device is preferably designed in such a way that both positioning of the gripper by translation along three perpendicular axes (x, y, z) and orientation of the gripper by rotation around three perpendicular axes are possible.

In a preferred embodiment, the gripper is of multipart design, wherein a first and a second gripper part of the gripper each have a toolholder gripping contour, in particular an arc-shaped toolholder gripping contour, for picking up a toolholder and a tool gripping contour for picking up a tool, wherein the gripper parts are held on a controllable actuator of the gripper, by means of which a spacing of the gripper parts can be adjusted, wherein at least one object can be clamped by reducing the spacing of the gripper parts. A simple and functionally reliable construction of the gripper is thus achieved.

One expedient possibility here is for the tool holder gripping contour and the tool gripping contour of the respective gripper part to be arranged spaced apart from one another. For a construction which is simple in terms of manufacture, the first and the second gripper part can be formed in mirror symmetry with one another and/or can be formed by identical components, in particular plate-shaped components.

With the above and other objects in view there is also provided, in accordance with the invention, a shrinkage and measurement station having at least one of the apparatuses according to the invention.

Moreover, a system for the provision, in particular automated provision, of a complete tool consisting of a toolholder and a tool, in particular a milling tool, having the shrinkage and measurement station according to the invention is claimed. Here, provision is preferably made for the system to have a balancing station for checking the balance of a complete tool and/or for balancing a complete tool.

With the above and other objects in view there is also provided, in accordance with the invention, a method for operating the system as described.

The advantages obtained from the shrinkage and measurement station according to the invention, the system according to the invention and the methodology according to the invention are identical with the already acknowledged advantages of the apparatuses according to the invention, and therefore they are not repeated at this point.

The advantageous embodiments and/or developments of the invention which have been explained above and/or presented in the dependent claims can be employed individually but also in any desired combination—except in the cases where there are clear dependency relationships or mutually exclusive alternatives, for example.

Other features which are considered as characteristic for the invention are set forth in the appended claims.

Although the invention is illustrated and described herein as embodied in apparatus for the provision, in particular automated provision, of a complete tool, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
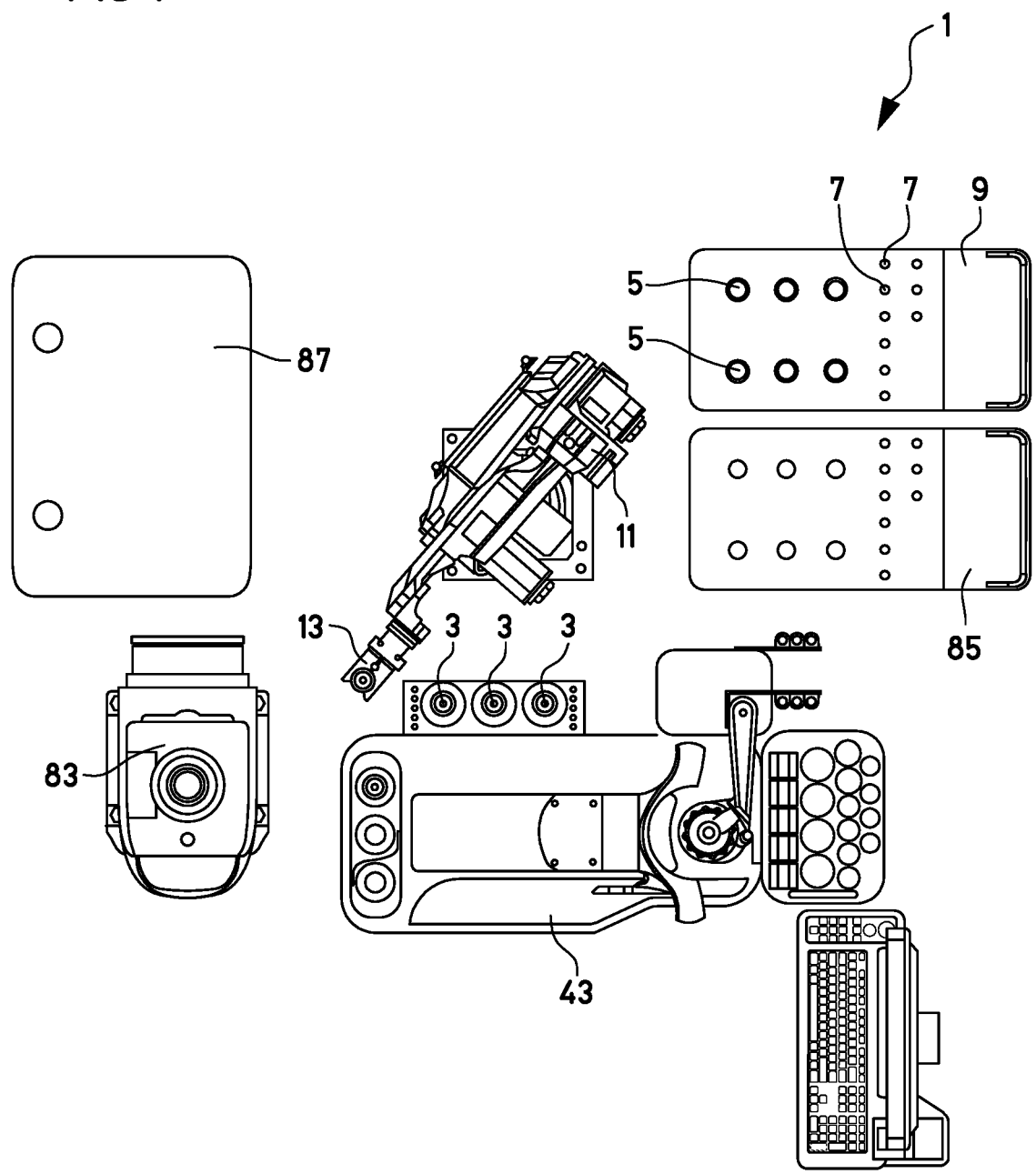
FIG. 1 is a schematic view, in a plan illustration from above, of a system according to the invention for providing complete tools comprising toolholders and tools.

Referring now to the figures of the drawing in detail and first, in particular, to FIG. 1 thereof, there is shown a system 1 according to the invention for the automated provision or production of complete tools 3 comprising toolholders 5 and tools 7. The system 1 comprises a mobile tool carriage 9, which is loaded with a plurality of toolholders 5 and a plurality of tools 7, which are here designed as milling tools by way of example. The tool carriage 9 is arranged in the vicinity of a controllable movement device, which is here designed as a robot arm 11 by way of example, by means of which the toolholders 5 and the tools 7 can be moved within the system 1. In this case, the tool carriage 9 is situated in the gripping range of a gripper 13 of the robot arm 11. As an alternative to the tool carriage 9, the system 1 could have a high-bay rack, for example. Feeding could furthermore also be performed by means of a chain magazine or wheeled magazine for toolholders 5, for example. Feeding by means of a continuous conveyor belt would likewise be possible.

Here, the robot arm 11 is designed in such a way that the position of the gripper 13 can be changed by translation along three perpendicular axes (x, y, z) and the orientation or alignment of the gripper 13 can be changed by rotation around three perpendicular axes.

Figure 7:
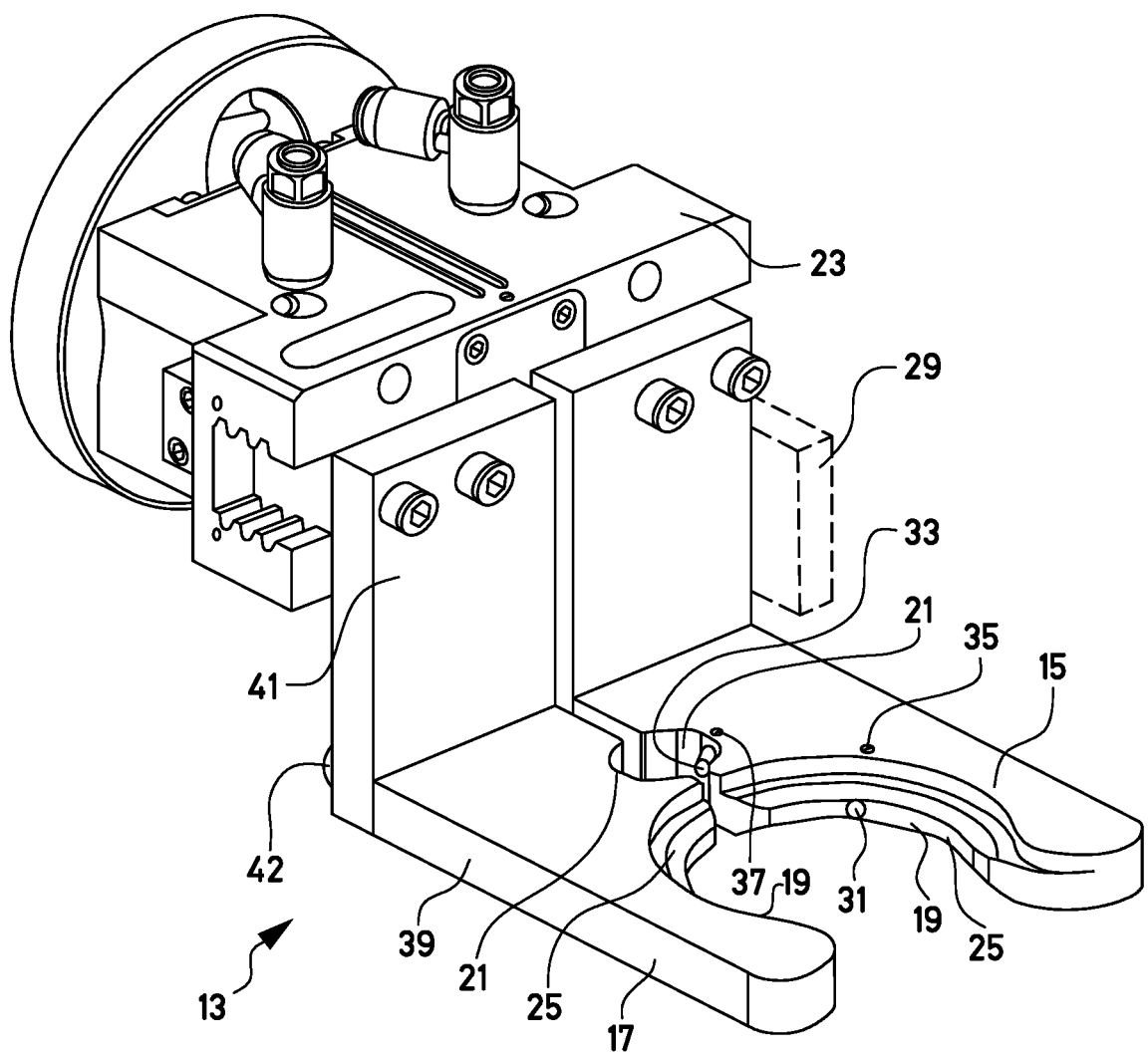
FIG. 7 is a perspective view of a gripper of a robot arm of the system according to the invention.

The gripper 13 is shown in an enlarged illustration in FIG. 7. By means of the gripper 13, both the toolholders 5 and the tools 7 can be picked up. According to FIG. 7, the gripper 13 is of multipart design, wherein the gripper 13 has a first gripper part 15 and a second gripper part 17. Each gripper part 15, 17 has a toolholder gripping contour 19, which is formed by a recess and, in this case, by way of example, is arc-shaped, for gripping a toolholder 5, and a tool gripping contour 21, likewise formed by a recess, for gripping a tool 7. The gripper parts 15, 17 are held on a controllable actuator 23 of the gripper 13, which is here operated pneumatically by way of example, by means of which a spacing of the gripper parts 15, 17 can be adjusted. By reducing the spacing of the gripper parts 15, 17, the toolholders 5 and the tools 7 can be clamped between the gripper parts 15, 17 and picked up thereby.

Figure 3:
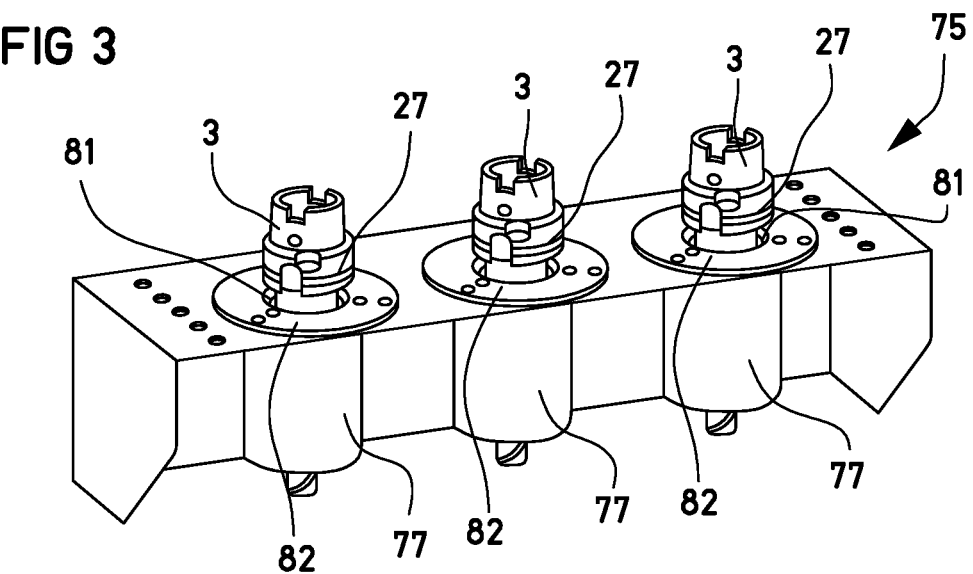
FIG. 3 is a perspective view of a cooling device of the shrinkage and measurement station.

To grip a toolholder 5, each gripper part 15, 17 furthermore has an inward-projecting web 25 in the form of a ring segment, by means of which the respective gripper part 15, 17 can engage in an encircling gripper groove 27 (FIG. 3) in the respective toolholder 5.

As is furthermore shown in FIG. 7, the gripper 13 furthermore has a sensor 29. By means of the sensor 29, it is possible to determine whether there is a complete tool 3 or a toolholder 5 in the vicinity of the gripper 13. Here—by way of example—the sensor 29 is formed by an ultra-sonic sensor. Moreover, the gripper 13 also has sensors 31, 33. In this case, sensor 31 is associated with the toolholder gripping contour 19 of a gripper part, while sensor 33 is associated with the tool gripping contour 21 of a gripper part. Here, sensor 33 can be used to determine whether a tool 7 is currently clamped or has been picked up on the gripper 13. By means of sensor 31 it is possible to determine whether a toolholder 5 is currently clamped on the gripper 13. Here—by way of example—the sensors 31, 33 are formed by inductive sensors. Moreover, each of the sensors 31, 33, which are pinshaped in this case, is arranged in a recess in the gripper part 15 and held in the recess by means of a clamping screw 35, 37.

According to FIG. 7, each gripper part 15, 17 is here formed by two interconnected plate bodies 39, 41. In this case, the plate bodies 39, 41 of the respective gripper part 15, 17 are connected to one another by means of a plurality of connecting elements 42, here—by way of example—connecting screws. In this case, the toolholder gripping contour 19 and the tool gripping contour 21 are formed on the plate body 39 of the respective gripper part 15, 17. Recesses, here—by way of example—bores, are provided in the plate body 41 of the respective gripper part 15, 17 to connect the gripper parts 15, 17 to the actuator 23. Furthermore, the plate bodies 41 of the gripper parts 15, 17 are of identical design or configuration here. More-over, the gripper parts 15, 17 are of substantially mirror-symmetrical design with respect to one another.

As is furthermore shown in FIG. 1, the system 1 also has a controllable shrinkage and measuring station 43. The shrinkage and measurement station 43 is likewise arranged in the gripping range of the gripper 13 of the robot arm 11. According to FIG. 2, the shrinkage and measurement station 43 has a spindle 45, which can be driven in rotation by means of a driving device. The spindle 45 has a holding device 47 (FIG. 6) for holding a toolholder 5 or a complete tool 3. Here—by way of example—the holding device 47 is formed by an HSK inter-face. Moreover, the shrinkage and measurement station 43 also has a measuring device 49, here—by way of example—an optical measuring device, arranged in the region of the spindle 45 for the purpose of measuring a complete tool 3 held on the spindle 45. By means of the measuring device 49, it is possible in this case to determine the length of a complete tool 3 and the diameter of a tool 7 of the complete tool 3, for example. In this case, the spindle 45 can be rotated axially with the complete tool 3 held thereon during the measurement of a complete tool 3.

Here, the optical measuring device 49 has a camera 51 as an image acquisition device for acquiring images and/or film recordings of a complete tool 3 held on the spindle 45. Moreover, the measuring device 49 also has a signal link to a screen 53 for displaying the camera recordings. The measuring device 49 furthermore has a signal link to a data transmission de-vice (not shown here) for the wireless transmission as data of complete-tool dimensions determined to an RFID chip of a toolholder 5.

Figure 2:
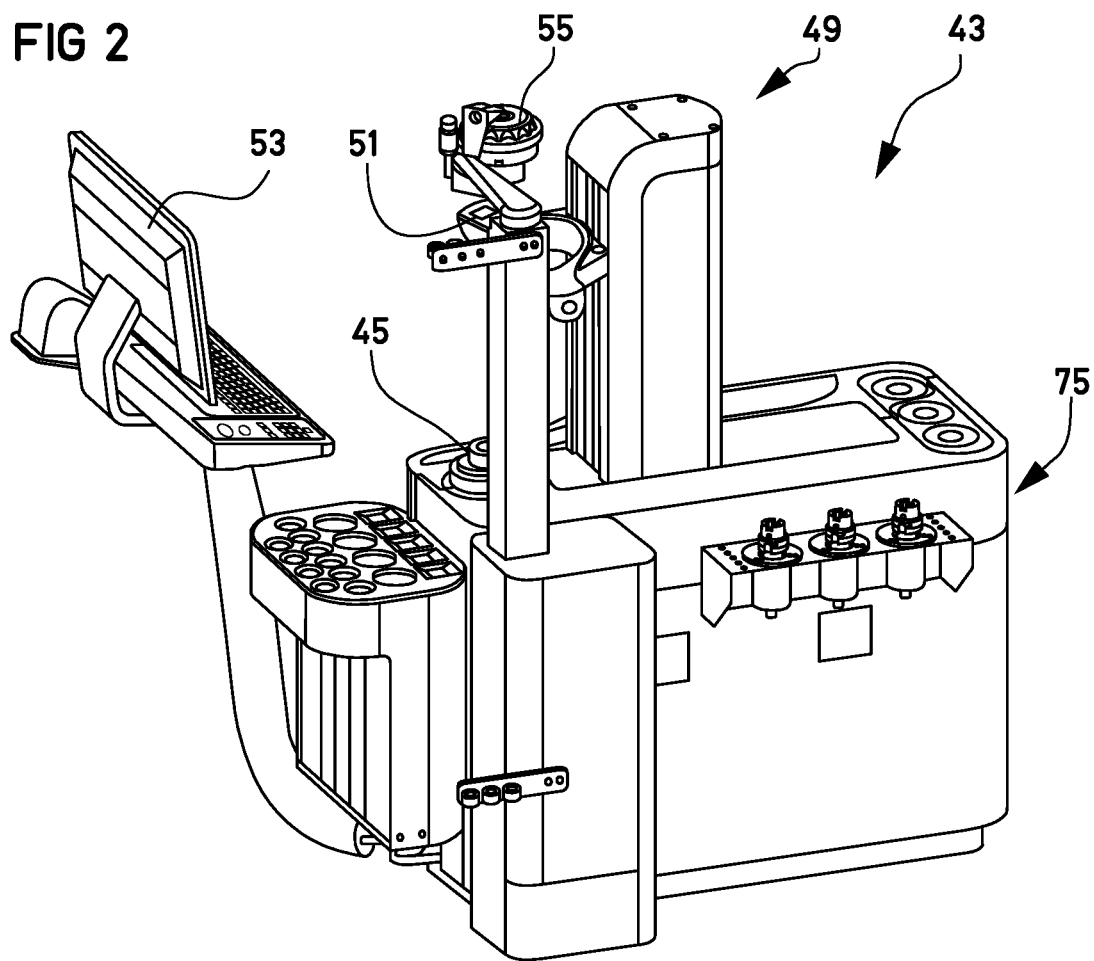
FIG. 2 is a perspective view of a shrinkage and measurement station of the system according to the invention.

As is furthermore shown in FIG. 2, the shrinkage and measurement station 43 also has a heating device, arranged in the region of the spindle 45, for heating the shrink-fit chuck of a toolholder 5 held on the spindle 45. Here, the heating device has a ring-shaped coil element 55, which has an induction coil and can be mounted on a toolholder 5, for the inductive heating of a shrink-fit chuck.

Figure 4:
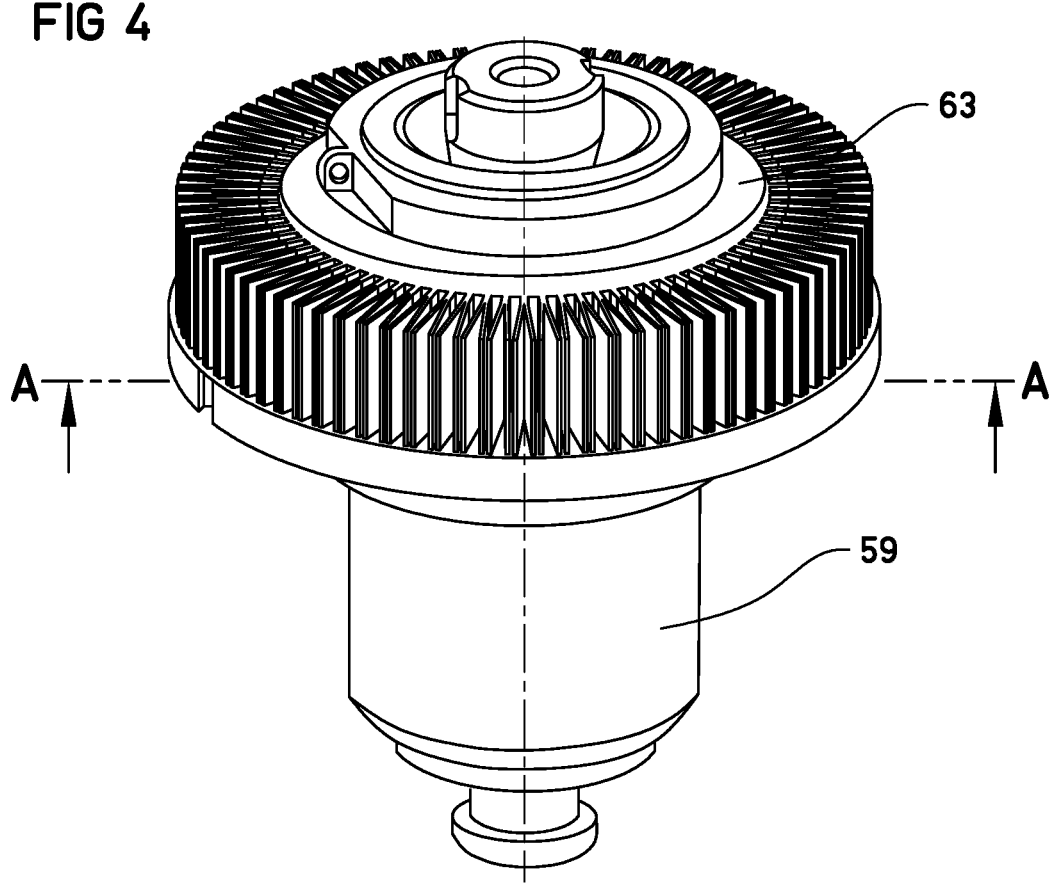
FIG. 4 is a perspective view of an adapter element of the shrinkage and measurement station.

The construction of the spindle 45 is now explained in greater detail with reference to FIGS. 4 to 6. In FIG. 6, a complete tool 3 is held on the spindle 45. The spindle 45 has a spindle element 57, indicated by dashed lines in FIG. 6, and an adapter element 59 fixed releasably on the spindle element 57. On the adapter element 59, the holding device 47 is designed to hold a toolholder 5. The spindle element 57 is held in an axially rotatable manner in a spindle holder 61 of the shrinkage and measurement station 43. In an alternative embodiment of the spindle, the holding device 47 could also be provided on the spindle element itself, and therefore the adapter element 59 is then no longer needed here.

As is furthermore apparent from FIG. 6, the spindle 45 is assigned a ring-shaped cooling element 63, by means of which the spindle 45 is air-cooled. In this way, the heat input into the spindle 45 is effectively reduced, thereby making it possible to measure complete tools 3 held on the spindle 45 with an increased measurement accuracy. If a heated complete tool 3 is held on the spindle 45, this is also cooled by means of the cooling element 63.

Here, the cooling element 63 surrounds in a ring shape the adapter element 59 of the spindle 45. More specifically, the cooling element 63 in this case surrounds in a ring shape a holding section 65 of the adapter element 59, said holding section having the holding device 47. In this case, the ring-shaped cooling element 63 rests both by an inner circumferential wall 67 and by an end wall 69 in surface contact against the adapter element 59 of the spindle 45. In an alternative embodiment of the spindle, the cooling element 63 could also surround in a ring shape the spindle element 57.

Figure 5:
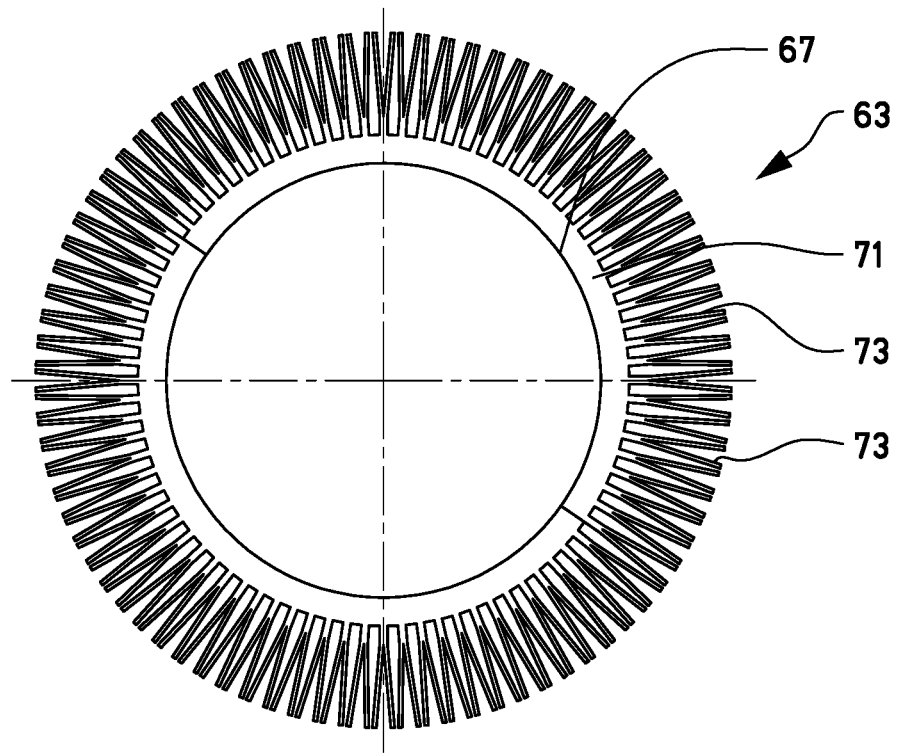
FIG. 5 shows a ring-shaped cooling element of the adapter element in an illustration from above.
Figure 6:
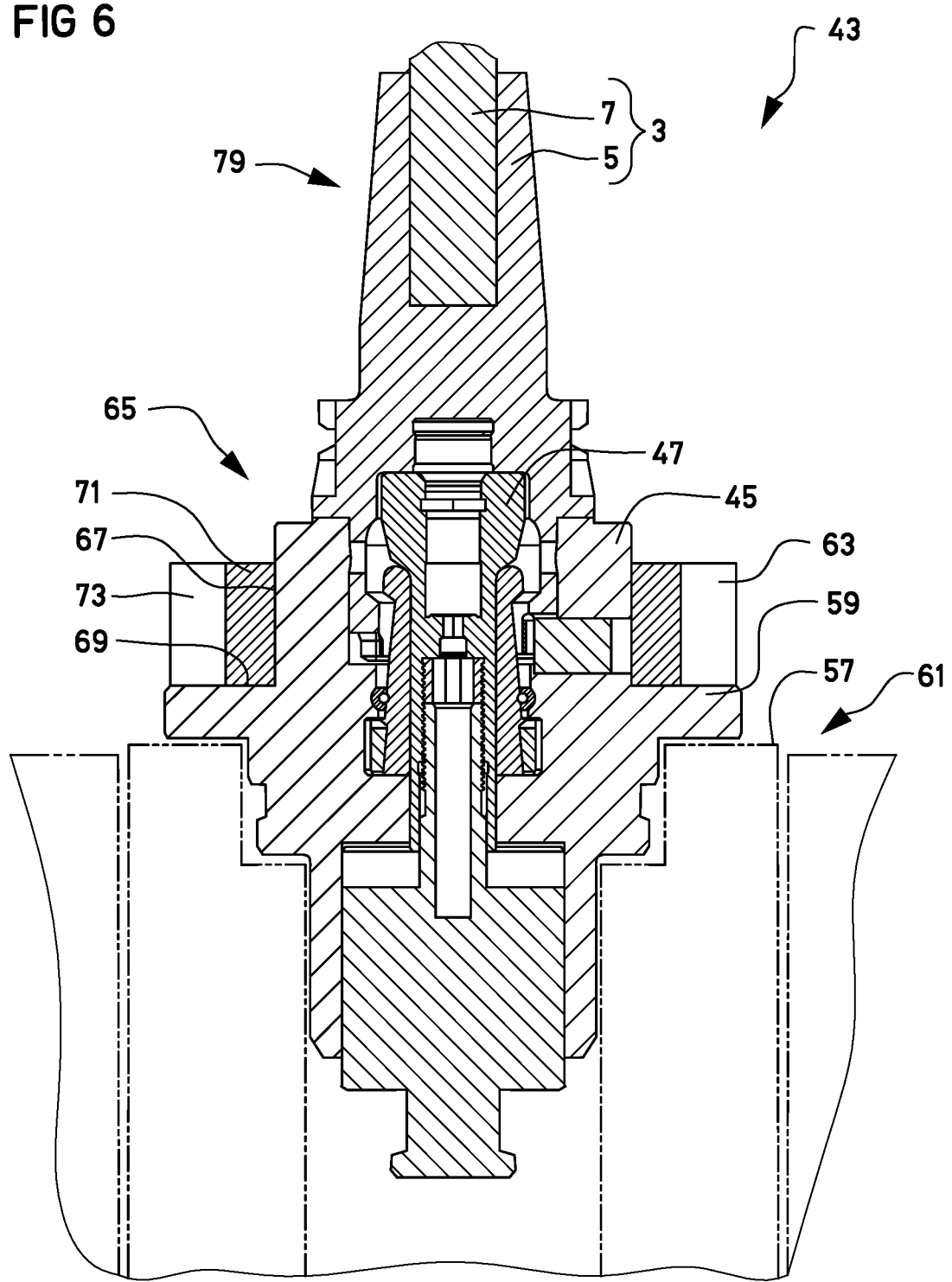
FIG. 6 is a sectional view of a section taken along the section plane A-A in FIG. 4.

The cooling element 63 here furthermore has a sleeve-shaped inner region 71 and a plurality of cooling ribs 73 projecting outward from the inner region 71 (FIG. 5). In this case, each cooling rib 73 has an inner region with a single rectilinear cooling rib web, which branches outward into two rectilinear cooling rib webs. As an alternative, it would also be possible, for example, to provide cooling ribs that have a single cooling rib web extending continuously in an arc.

As is furthermore shown in FIG. 2, the shrinkage and measurement station 43 also has a cooling device 75 for cooling measured complete tools 3. Here, the cooling device 75 has a plurality of cooling pots 77 arranged in series, wherein one complete tool 3 can be cooled by means of each cooling pot 77. For this purpose, a complete tool 3 can be arranged partially in an interior space of a cooling pot 77 in an upside down orientation, i.e. with the clamped tool 7 first, and brought into surface contact by means of a shrink-fit chuck section 79 (FIG. 6) of the toolholder 5 with a cooled inner wall 81 of the cooling pot 77. Here, the cooling pots 77 have a liquid cooling system. To secure the cooling pots 77 on the shrinkage and measurement station 43, each cooling pot 77 has an outward-projecting annular flange 82 having continuous apertures, through which connecting elements, here—by way of example—connecting screws, are passed. Here, moreover, each cooling pot 77 is open on the underside.

As is furthermore shown in FIG. 1, the system 1 also has a controllable balancing station 83, by means of which the balance of a measured and cooled complete tool 3 can be checked. Optionally, the balancing station 83 could also be designed in such a way that a complete tool 3 can be balanced by means of said station. Moreover, the system 1 has a mobile tool carriage 85, which can be loaded with checked complete tools 3. As an alternative to the tool carriage 85, the system 1 could also have a high-bay storage system. The balancing station 83 and the tool carriage 85 are likewise arranged in the gripping range of the gripper 13 of the robot arm 11. The system 1 furthermore also has a control station 87, by means of which the robot arm 11, the shrinkage and measurement station 43 and the balancing station 83 are controlled, thus enabling the system 1 to be operated in an automated manner. In this case, all the controllable devices of the system 1 are networked in modular fashion via a master computer of the control station 87 in terms of data and/or signal transmission.

Illustrative automated operation of the system 1 and a method for operating the system 1 will now be explained in greater detail below:

In the initial situation, the tool carriage 9 is loaded with toolholders 5 and tools 7. First of all, a toolholder 5 is picked up from the tool carriage 9 by means of the robot arm 11. By means of a cleaning device, e.g. a brush, associated with the tool carriage 9 for example, a receiving hole of the toolholder 5 picked up is cleaned. In a similar way, the interface region of the spindle can also be cleaned at regular intervals by means of a wiping device, e.g. a wiping device that can be gripped by means of the robot arm 11. The toolholder 5 is then inserted into the HSK interface of the spindle 45 by means of the robot arm 11. The HSK interface of the spindle 45 is then closed, with the result that the toolholder 5 is held firmly on the spindle 45. Finally, the toolholder 5 is identified by an RFID chip attached to the toolholder 5, and the relevant program for shrink-fitting a tool 7 is called.

A tool 7 is then picked up from the tool carriage 9 by means of the robot arm 11. The tool 7 picked up has a readable code, e.g. a QR code, barcode or data matrix code, which is read with a reading device mounted, for example, on the robot arm 11. After the code has been identified and checked, the toolholder 5 is heated by means of the heating device 53, and the tool 5 is inserted into the toolholder 7 by means of the robot arm 11. Finally, the tool 5 is then shrunk into the toolholder 7 and, in the process, a desired Z dimension or length dimension of the complete tool 3 is set by means of the robot arm 11 and the measuring device 49. As an alternative to setting by means of the robot arm 11, it would also be possible, for example, for the Z dimension of the complete tool 3 to be set by means of a stop element or stop mandrel, which is mounted on the spindle 45 and can be extended from the spindle 45, as a stop for a tool 7 inserted into a toolholder 5.

The complete tool 3 is then removed from the spindle 45 and inserted for cooling into one of the cooling pots 77 by means of the robot arm 11 until the complete tool 3 reaches the desired temperature, e.g. room temperature. In this case, the temperature of the complete tool 3 is measured by means of a temperature sensor of the respective cooling pot 77. The cooled complete tool 3 is then removed from the cooling pot 77 by means of the robot arm 11 and inserted into the balancing station 83 to check the balance. The spindle of the balancing station 83 can also be cleaned at regular intervals by means of a wiping device, e.g. one that can be gripped by the robot arm 11. After this check, the complete tool 3 is removed from the balancing station 83 by means of the robot arm 11. Before the measurement of the cutting edges of the complete tool 3, the cutting edges are cleaned of dust and other adhesions, e.g. by dipping the cutting edge region of a complete tool 3 into a cleaning bath or by dabbing with an adhesive compound. The complete tool 3 is then inserted into the HSK interface of the spindle 45. The HSK interface of the spindle 45 is then closed, with the result that the tool-holder 5 is held firmly on the spindle 45. Finally, the complete tool 3 is re-identified by the RFID chip attached to the toolholder 5, and the relevant program for measuring the complete tool 3 is then called. The complete tool 3 is then measured by means of the measuring device 49. During this process, the complete tool 3 is rotated axially by means of the spindle 45. After measurement, the complete tool 3 is removed from the spindle 45 and placed on the tool carriage 85 by means of the robot arm 11. If the balance of the complete tool 3 is inadequate, it can be additionally balanced manually by a worker.

In an alternative mode of operation, the system 1 may also be used to shrink tools 7 out of toolholders 5.

The following is a summary list of reference numerals and the corresponding structure used in the above description of the invention:
1 system
3 complete tool
5 toolholder
7 tool
9 tool carriage
11 robot arm
13 gripper
15 gripper part
17 gripper part
19 toolholder gripping contour
21 tool gripping contour
23 actuator
25 web
27 gripper groove
29 sensor
31 sensor
33 sensor
35 clamping screw
37 clamping screw
39 plate body
41 plate body
43 shrinkage and measurement station
45 spindle
47 holding device
49 measuring device
51 camera
53 screen
55 coil element
57 spindle element
59 adapter element
61 spindle holder
63 cooling element
65 holding section
67 circumferential wall
69 end wall
71 inner region
73 cooling rib
75 cooling device
77 cooling pot
79 shrink-fit chuck section
81 inner wall
83 balancing station
85 tool carriage
87 control station
42 connecting element
82 annular flange

The invention claimed is:

1. An apparatus for provisioning a complete tool with a toolholder and a tool, the apparatus comprising:
   a spindle to be driven in rotation by a driving device, said spindle having a holding device for holding the toolholder;
   a measuring device for measuring the complete tool held on said spindle, said measuring device being configured to measure a length of the complete tool including the tool holder and the tool and to measure a diameter of the tool of the complete tool;
   a heating device for heating a shrink-fit chuck of the toolholder held on said spindle; and
   a cooling device configured and disposed for air-cooling said spindle while the complete tool is being held by said tool holder on said spindle.

2. The apparatus according to claim 1, wherein the apparatus is configured for automatically providing a drilling and/or milling tool and said measuring device is an optical measuring device.

3. The apparatus according to claim 1, wherein said cooling element surrounds in a ring shape a spindle element of said spindle and/or an adapter element of said spindle, said adapter element being releasably connected to said spindle element and having a said holding device, said cooling element surrounding in a ring shape a holding section of said spindle, said holding section having said holding device.

4. The apparatus according to claim 1, wherein said cooling element is a ring-shaped cooling element resting with an inner circumferential wall with surface contact against said spindle, and/or wherein said cooling element rests with at least one end wall with surface contact against said spindle.

5. The apparatus according to claim 1, wherein said cooling element has a ring-shaped or sleeve-shaped inner region and a plurality of cooling ribs that project outward from said inner region, and wherein said cooling ribs have a profile which is arc-shaped or partly rectilinear, in a plan view of said cooling element.

6. The apparatus according to claim 1, wherein said holding device of said spindle is configured to receive a machine tool interface of a toolholder, and said holding device of said spindle has a steep taper interface, a hollow shank taper interface, or a polygonal shank taper interface.

7. The apparatus according to claim 1, wherein said measuring device is an optical measuring device with at least one image acquisition device for acquiring images and/or film recordings of a complete tool held on said spindle, and/or wherein said measuring device has a signal link to a data transmission device for transmitting data of complete-tool dimensions acquired by said image acquisition device.

8. The apparatus according to claim 1, wherein said heating device has at least one coil element with an induction coil, for heating a shrink-fit chuck of the toolholder.

9. The apparatus according to claim 8, wherein said coil element is ring-shaped and configured for mounting on the toolholder.

10. The apparatus according to claim 1, which further comprises a further cooling device with at least one cooling pot for cooling the complete tool, said cooling pot having an inner space configured to partially or completely receive the complete tool, after having been removed from said spindle, and to contact the complete tool with a cooled inner wall of said cooling pot.

11. The apparatus according to claim 10, said cooling pot is a coolant-cooled cooling pot, the complete tool is received in the inner space in an upside down orientation, and the cooled inner wall comes into contact with a shrink-fit chuck section of the toolholder of the complete tool.

12. The apparatus according to claim 1, further comprising a master computer connecting said measuring device in a network for data and/or signal transmission, and wherein complete tool dimensions determined by means of said measuring device are stored as data on an RFID chip of a measured complete tool and/or transmitted to a central data network.

13. An apparatus for provisioning a complete tool with a toolholder and a tool, the apparatus comprising:

a spindle to be driven in rotation by a driving device, said spindle having a holding device for holding the toolholder;

a measuring device for measuring the complete tool held on said spindle, said measuring device being configured to measure a length of the complete tool including the tool holder and the tool and to measure a diameter of the tool of the complete tool;

a heating device for heating a shrink-fit chuck of the toolholder held on said spindle;

a cooling device configured and disposed for cooling at least one of said spindle or the complete tool while the complete tool is being held by said tool holder on said spindle; and a further cooling device with at least one cooling pot for cooling the complete tool, said cooling pot having an inner space configured to partially or completely receive the complete tool, after having been removed from said spindle, and to contact the complete tool with a cooled inner wall of said cooling pot.

14. The apparatus according to claim 13, said cooling pot is a coolant-cooled cooling pot, the complete tool is received in the inner space in an upside down orientation, and the cooled inner wall comes into contact with a shrink-fit chuck section of the toolholder of the complete tool.

* * * * *